(12) United States Patent
Kuwabara

(10) Patent No.: US 6,182,737 B1
(45) Date of Patent: Feb. 6, 2001

(54) SHEET OPENING/CLOSING AND SPREADING APPARATUS

(75) Inventor: Toshiaki Kuwabara, Chiba (JP)

(73) Assignee: Toto Kogyo Company, Ltd., Tokyo (JP)

(*) Notice: Under 35 U.S.C. 154(b), the term of this patent shall be extended for 0 days.

(21) Appl. No.: 09/288,720

(22) Filed: Apr. 9, 1999

(51) Int. Cl.$^7$ .................................................. A47H 5/00
(52) U.S. Cl. .................................... 160/84.06; 160/84.02
(58) Field of Search ............................. 160/84.06, 84.02, 160/84.01, 66, 243; 52/63; 47/17

(56) References Cited

U.S. PATENT DOCUMENTS

| | | | |
|---|---|---|---|
| 3,315,727 | * 4/1967 | Clark | 160/84.06 |
| 3,777,425 | * 12/1973 | Le Bourgeois | 160/84.06 X |
| 3,964,781 | * 6/1976 | Fenton | 160/84.06 X |
| 4,565,230 | * 1/1986 | Van Rijn et al. | 160/84.01 |
| 4,683,933 | * 8/1987 | Dunbar | 160/84.02 X |
| 5,265,373 | * 11/1993 | Vollebregt | 160/84.01 X |
| 5,809,701 | * 9/1998 | Vollebregt | 160/84.06 X |

* cited by examiner

Primary Examiner—David M. Purol
(74) Attorney, Agent, or Firm—McGlew and Tuttle, P.C.

(57) ABSTRACT

A sheet opening/closing apparatus capable of being utilized as any of a sheet spreading mechanism, a ventilating mechanism, and a heat retaining and light shielding mechanism, superior in all of working efficiency, assembling performance and economy, capable of minimizing stain and damage of the sheet used, and exerting no bad influence on the growth of plants. The sheet opening/closing apparatus includes a pair of support rods opposed to each other, a track 8 laid between the two support rods, and a movable member 9 attached to the track 8 movably. By utilizing the movement of the movable member along the track, the sheet is spread or opened between the two support rods.

18 Claims, 12 Drawing Sheets

SHEET OPENING/CLOSING AND SPREADING APPARATUS

BACKGROUND OF THE INVENTION

The present invention relates to a sheet opening/closing and spreading apparatus. Particularly, the invention is concerned with a ventilating apparatus which opens and closes an opening formed at a suitable position in a roof surface, a side face or a gable end face of a greenhouse or is concerned with a sheet opening/closing and spreading apparatus suitable for opening and closing a heat retaining or light shielding sheet in a greenhouse.

Generally, in a greenhouse called a vinyl house which is used for the growth of plants, for example, a large number of arch pipes are erected on the ground and support rods and sheet retaining frames are disposed in a horizontal direction intersecting the arch pipes to constitute a framework, then a transparent or translucent sheet formed of a synthetic resin for example is spread manually on the said framework through the sheet retaining frames.

In the above greenhouse, an opening is formed at a suitable position in a roof surface, a side face or a gable end face and is opened and closed manually with use of a sheet to effect ventilation.

In the above greenhouse, a heat retaining or light shielding sheet is disposed at an upper or middle position and is opened and closed manually to adjust the interior temperature or allow the sunlight to be radiated directly to plants or cut off the sunlight.

Or a light shielding sheet is superimposed on the sheet which has been spread over the framework and is opened and closed manually to permit or cut off a direct radiation of sunlight for the interior of the greenhouse, thereby adjusting the interior temperature or the amount of sunlight radiated directly to plants.

When a sheet is to be spread over the framework as mentioned above, first the sheet is put on the framework manually and is then fixed at arbitrary positions into a sheet retaining frame of, for example, a dovetail shape through an elastic, retaining linear member.

When the interior of the greenhouse is to be ventilated, for example, the upper end of a sheet is fixed to the upper end of an opening through such sheet retaining frame and linear member as referred to above, while the lower end of the sheet is wound round a pipe extending in the direction traversing the sheet covering direction, and the said pipe is rotated manually or by means of a motor or the like, thereby winding the sheet onto the pipe from below to above and allowing the opening to be opened. Conversely, by winding back the thus-wound sheet from above to below, the opening is closed.

In the same manner as in the above ventilating mechanism, a heat retaining or light shielding sheet is opened and closed. That is, one end of the sheet is fixed to the framework or a support rod disposed in the interior, while the opposite end thereof is wound round a pipe, and the pipe is rotated manually or by means of a motor to take up the sheet, allowing an opening to be formed at a predetermined position. Conversely, upon winding back of the sheet, the sheet is spread at the predetermined position.

The above mechanism for spreading sheet manually over the greenhouse framework, the ventilating mechanism which performs winding up and winding back of sheet, and the heat retaining and light shielding mechanism which also performs winding up and winding back of sheet, do not involve any special defect, but involve the following points to be improved.

First, for the sheet spreading mechanism, it is desired that the following points be remedied.

(1) For fixing the spread sheet onto the framework, it is necessary that a sheet retaining frame of a dovetail groove shape be secured to vertical support rods such as arch pipes, thus resulting in an increase in the number of components, and it is difficult to effect assembly, which is disadvantageous in point of machinability, assembling performance and economy. Besides, for fixing the sheet to the sheet retaining frame, the sheet is drawn up manually over the whole framework in advance and is then fixed to the sheet retaining frame, so it is impossible to effect the sheet spreading work automatically, and the manually spreading work is very troublesome and difficult. Particularly, in the case where the fixing position is on the roof surface or an upper position of a side face or gable end face, the sheet fixing work is performed at an elevated place and there is a danger that the worker may fall. Further, in the event a sudden gust of wind should blow during the sheet fixing work at such an elevated position, the sheet may be flapped, blown up, or blown off.

(2) Likewise, when fixing the sheet to the sheet retaining frame, it is necessary to pull the sheet uniformly or pull one end thereof forcibly so as to prevent the occurrence of wrinkles or concaves and convexes. But this pulling work is difficult and requires a large force or may injure the workers' hands.

(3) Even after fixing the sheet to the sheet retaining frame and spreading, it is necessary that bands be applied onto the sheet to prevent the sheet from being flapped partially with wind for example. Thus, the number of components required increases and the band mounting work is difficult and troublesome.

(4) With the sheet once spread over the framework and in the event a strong wind or a sudden gust of wind is blown against the sheet due to a typhoon for example, the sheet cannot immediately be removed from the framework and hence the greenhouse itself may be blown off or damaged together with the framework.

Secondly, for the foregoing ventilating mechanism, it is desired that the following points be remedied.

(a) In the case where the ventilating mechanism is disposed in a lower opening formed in a side face or gable end face of the greenhouse, since the sheet is wound up from below to above, if a pipe for winding up the sheet while closing the opening is located near the ground, snow will accumulate on the pipe portion and it is required to remove the snow before winding up the sheet in winter. Besides, if the snow freezes, the ventilating operation cannot be started at once, and it is likely that the sheet may be damaged or the pipe may be bent due to the weight of the snow.

(b) At the time of winding up or winding back the sheet, the sheet is rubbed against the framework and may be damaged. Besides, when the sheet is wound up, dust, water and snow adhered to the sheet are also wound up together with the sheet, so that the sheet is stained. In this case, if the dust is hard and large or if volcanic ash, sand or earth is wound up, the wind-up and wind-back operation becomes difficult and the sheet may be broken due to rubbing.

(c) With the sheet wound up and the opening left open, the sheet is wound up many turns on the pipe, like a bundle, so if the sheet is allowed to stand in this state, rain water may get into the bundle-like sheet or snow will accumulate thereon, thus resulting in that not only the wind-back operation becomes difficult but also the sheet stain becomes conspicuous and may cause the occurrence of mold.

(d) Since the sheet is wound up from below to above for opening an opening, if the opening is formed in the lower end portion of a side face close to the ground, wind or cold air will enter the interior of the greenhouse upon wind-up of the sheet, which is not desirable for the growth of small seedlings. Therefore, it is necessary that a sheet called a dead sheet be spread over a side face near the ground to prevent such entry of wind or cold air. Thus, in building a greenhouse, such a ventilating mechanism is inferior in assembling performance, machinability and economy.

(e) Since the sheet is wound round a pipe extending across the sheet, if the framework is bent or deflected, the pipe cannot be kept horizontal, thus giving rise to a fear that the sheet may be wound inclinedly on the pipe or the pipe may become immovable or the sheet may be damaged.

Thirdly, in the same manner as in the above ventilating mechanism, the heat retaining and light shielding mechanism, which performs sheet winding up and winding back operations, involves the drawback that the sheet rubs and is broken or the stain such as dust adhered to the sheet is wound up together with the sheet, causing stain or breakage of the sheet.

In view of the above-mentioned points it is an object of the present invention to provide a sheet opening/closing apparatus capable of being utilized as any of sheet spreading mechanism, ventilating mechanism, and heat retaining and light shielding mechanism, in a greenhouse, capable of performing operations automatically, superior in all of working efficiency, assembling performance and economy, further capable of keeping sheet stain and breakage to a minimum, and exerting no bad influence on the growth of plants.

SUMMARY OF THE INVENTION

In order to achieve the above-mentioned object, one basic means according to the present invention is characterized by comprising a pair of support rods opposed to each other, a track laid between the two support rods, and a movable member attached to the track movably, and in that a sheet is spread or opened between the two support rods with movement of the movable member along the said track.

Preferably, the movable member comprises a housing, a gear or sprocket disposed rotatably within the housing, and a drive shaft extending through the housing transversely of the housing and connected to the said gear or sprocket. The track is constituted by a chain belt which extends through the housing longitudinally of the housing and which is in mesh with the said gear or sprocket.

Preferably, a sheet fixing frame constituted by a dovetail frame, a pipe, or a pucker is attached to the movable member.

Further, a basic means according to the present invention is characterized by comprising a pair of support rods opposed to each other, a track laid between the two support rods, a movable member attached movably to the track, a sheet fixing frame attached to the movable member and extending in a direction traversing the movable member, and a sheet fixed at one end thereof to one of the support rods, and in that the opposite end of the sheet is fixed to the sheet fixing frame and the movable member is moved along the track, thereby causing the sheet to spread or open between the two support rods.

DESCRIPTION OF THE PREFERRED EMBODIMENTS

Embodiments of the present invention will be described hereunder with reference to the accompanying drawings.

Figure 1:
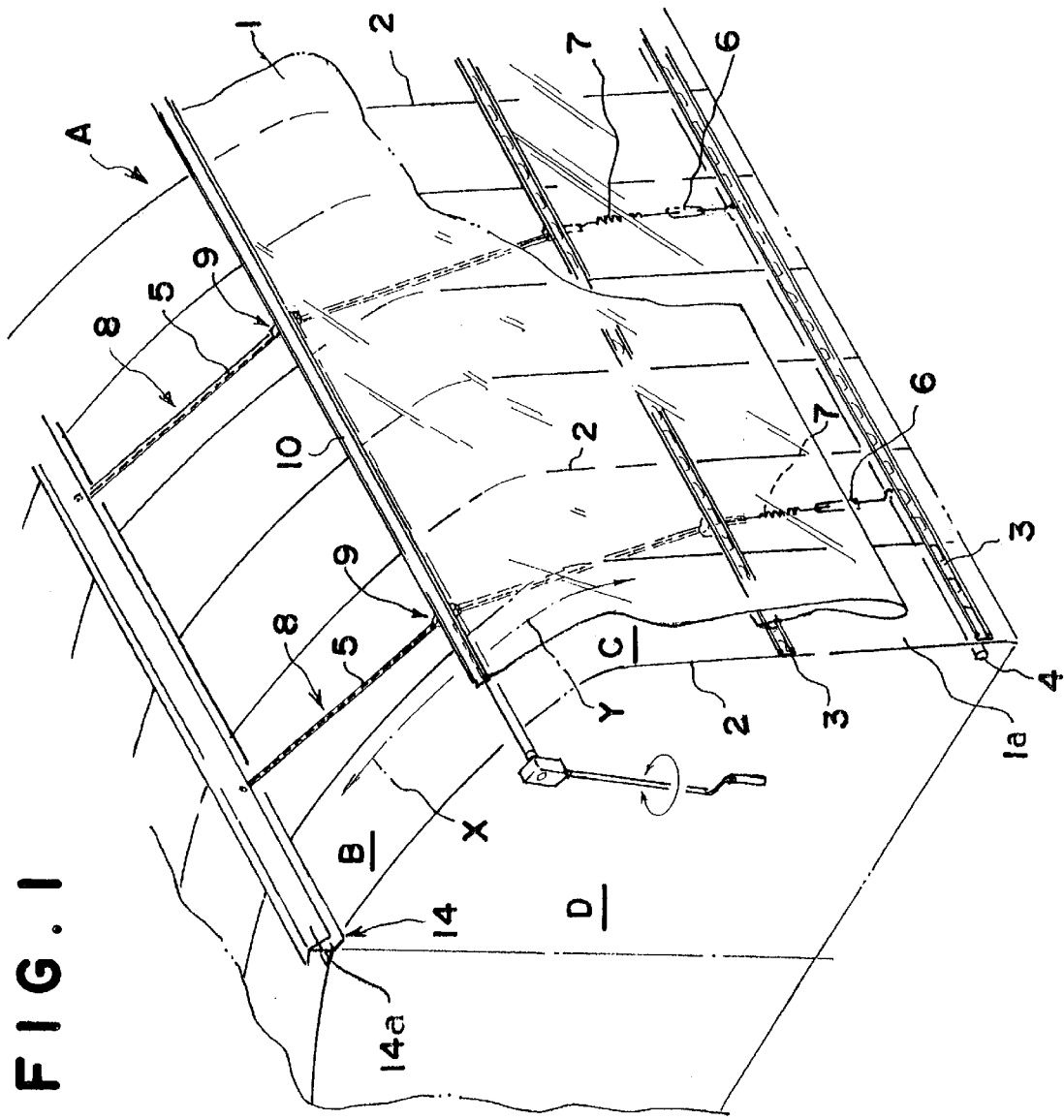
FIG. 1 is a partially cut-away perspective view of a greenhouse in which a sheet opening/closing apparatus embodying the present invention is used as a sheet spreading mechanism.

FIG. 1 illustrates a sheet opening/closing apparatus according to an embodiment of the present invention which is used as both a sheet spreading mechanism and a ventilating mechanism in a greenhouse.

A greenhouse A is constituted by a vinyl house with a transparent or translucent synthetic resin sheet 1 spread over a framework.

More specifically, in the greenhouse A, a large number of arch pipes 2, 2 as vertical support rods are erected on the ground and one or plural horizontal support rods 4, 4 and sheet retaining frames 3, 3 are disposed in a direction intersecting the arch pipes 2, to constitute a framework, with a sheet being spread over the framework so that it can be moved in both opening and closing directions.

A shade-like ridge member 14 is fixed centrally to the upper end of the framework and one or plural tracks 8 each comprising a chain belt 5, a turnbuckle 6 and a spring 7 and each extending along a side face C and a roof surface B are laid between the ridge member 14 and a lower support rod 3 at suitable intervals in the longitudinal direction of the greenhouse. Each track 8 may be constituted by only the chain belt 5 or by using wire, timing belt, rack, or rail.

One or plural movable members 9 are attached to the chain belt 5 in a vertically movable manner.

A sheet fixing frame 10 is attached to an upper portion of each movable member 9, the sheet fixing frame 10 extending in a direction traversing the movable member.

The lower end of the sheet 1 is fixed to a sheet retaining frame 3 located at a lower position, while the upper end of the sheet 1 is fixed to the sheet fixing frame 10. Therefore, when the movable member 9 and the sheet fixing frame 10 are moved in the direction of arrow X, namely, upward, along the chain belt 5, the sheet 1 moves while being pulled by the sheet fixing frame 10 and is spread over the upper portion of the side face C and the whole area of the roof surface B in the greenhouse A.

Conversely, when each movable member 9 and the sheet fixing frame 10 are moved in the direction of arrow Y, namely, downward, along the chain belt 5, the upper end of the sheet 1 goes down while allowing its lower portion to sag, whereby the roof surface B and the upper portion of the side face C are opened to permit ventilation for the interior of the greenhouse A. Thus, both spreading of the sheet 1 and ventilation for the interior of the greenhouse can be done by a single sheet opening/closing apparatus with vertical movement of the sheet 1.

Although in this embodiment the lower end of the sheet 1 is fixed to the sheet retaining frame 3 installed at an intermediate position of the side face C, one end of the sheet 1 may be fixed to the sheet retaining frame 3 located at the lowest position, whereby the sheet 1 can be spread throughout the whole area including both side face C and roof surface B. Further, a modification may be made so that the sheet 1 is moved in both opening and closing directions beyond the ridge member up to a sheet retaining frame 3 located on the opposite side, that is, throughout the whole area of the greenhouse.

In the case where the sheet 1 is fixed to the sheet retaining frame 3 located at an intermediate position, another sheet 1*a* is spread between the intermediate and lowest sheet retaining frames 3 by a known method.

In the ridge member 14, as well known, a shade-like member 14*a* is formed in the longitudinal direction so that when the movable member 9 and the sheet fixing frame 10 have moved up to their upper limit, they are received in a channel-like receptacle portion which is a space formed inside the shade-like member 14*a*.

The sheet opening/closing apparatus constructed as above may be disposed in a gable end face D of the greenhouse A.

Figure 2:
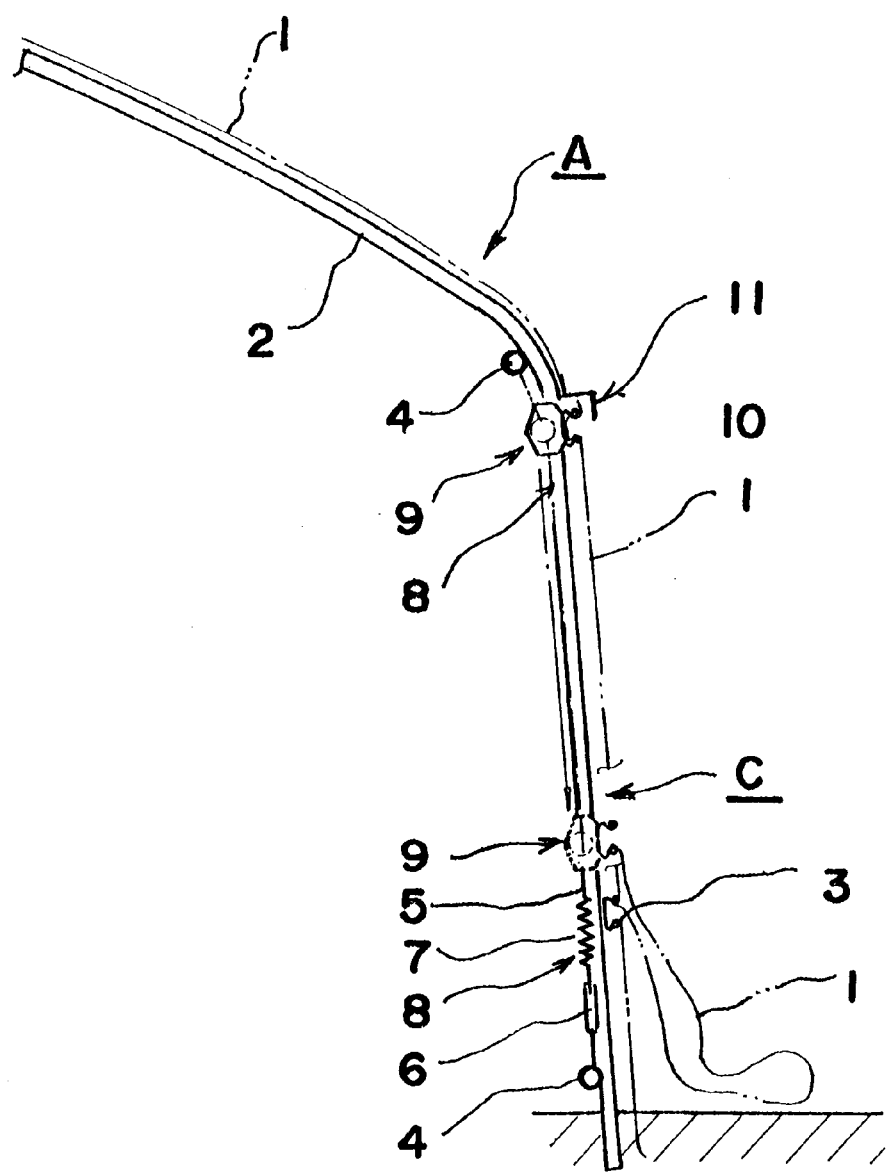
FIG. 2 is a partial sectional view in vertical section of a side portion of a greenhouse in which a sheet opening/closing apparatus embodying the present invention is used as a side ventilating mechanism.

Referring now to FIG. 2, there is illustrated a sheet opening/closing apparatus according to another embodiment of the present invention, which is disposed in a side face C of a greenhouse A and is utilized as a ventilating mechanism.

More specifically, a plurality of tracks 8 each comprising a chain belt 5, etc. are laid each vertically between upper and lower support rods 3 disposed in a side face C of a greenhouse A and extending longitudinally of the greenhouse. A movable member 9 attached to the track 8 vertical movably and a sheet fixing frame 10 of a dovetail groove shape is attached to the movable member 9, the sheet fixing frame 10 extending in a direction traversing the movable member 9. The lower end of a sheet 1 is fixed to a sheet retaining frame 2 disposed at a lower position of the side face C, while the upper end of the sheet 1 is fixed to the sheet fixing frame 10. As the movable member 9 moves vertically along the track 8, an opening defined between two upper and lower horizontal support rods 4, 4, is opened or closed to effect or stop ventilation for the interior of the greenhouse A. A shade-like member 11 is disposed longitudinally at an upper position of the side face C so that when the sheet 1 is drawn up in the closing direction, the sheet fixing frame 10 and the upper end of the sheet can be received within a channel-like receptacle portion formed inside the shade-like member 11.

The track 8 shown in FIG. 2 is laid along the inside of an arch pipe 2 as a vertical support rod and the movable member 9 moves somewhat inside the arch pipe 2, provided a modification may be made so that the movable member 9 moves outside the arch pipe 2. In the case where the support rods 4 and other members extending in a direction intersecting the arch pipe 2 are positioned inside the arch pipe 2, it is preferable for the movable member 9 to move outside the arch pipe 2 because otherwise those support rods 4 and other members would interfere with the movable member 9 during movement of the movable member. Conversely, if the support rods 4 and other longitudinally extending members are located outside the arch pipe 2, it is preferable for the movable member 9 to move inside the arch pipe 2.

Figure 3:
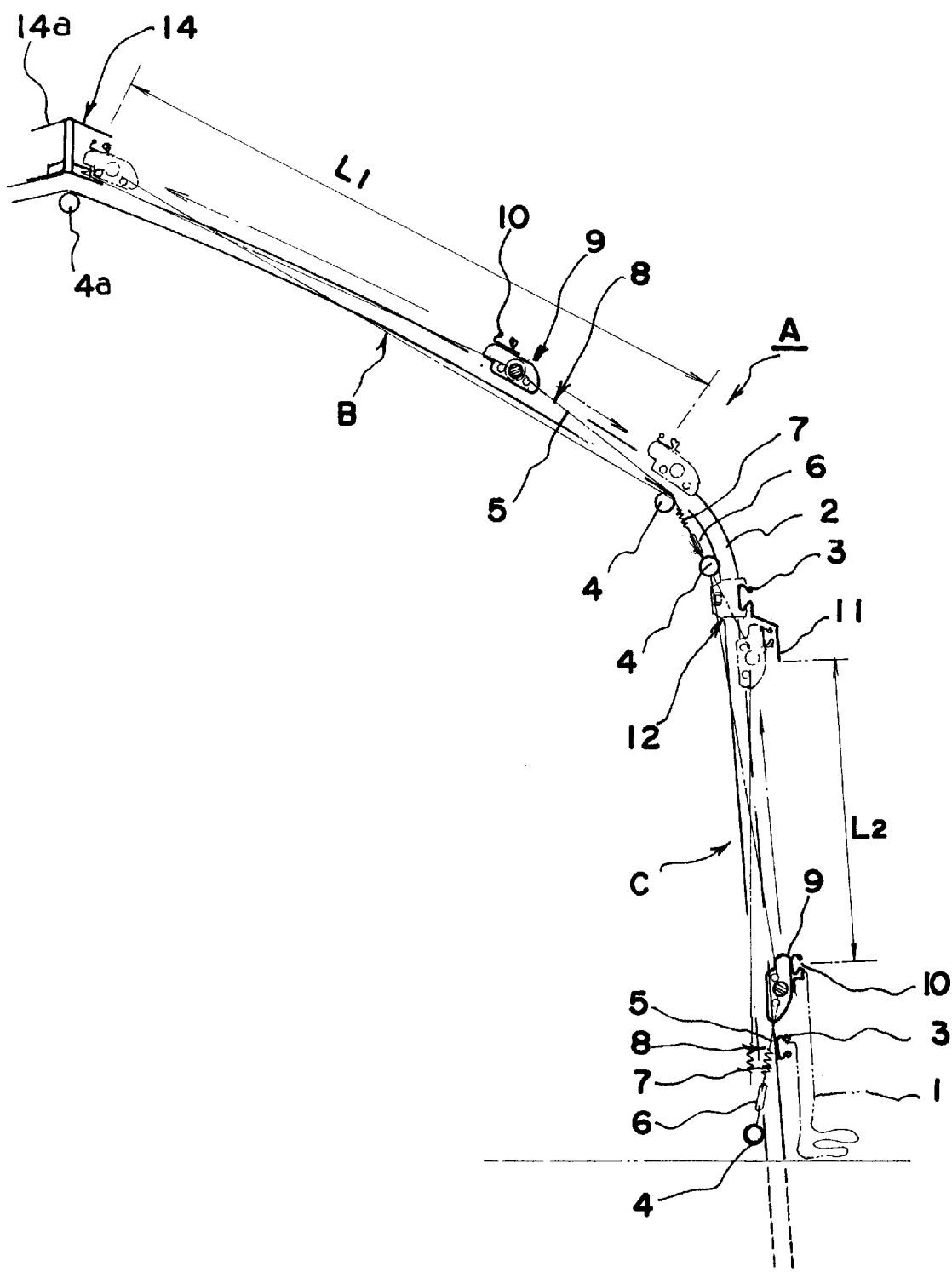
FIG. 3 is a partial sectional view in longitudinal section of a greenhouse in which a sheet opening/closing mechanism embodying the present invention is used as both a sheet spreading mechanism and a ventilating mechanism provided in both roof surface and side face.

Referring now to FIG. 3, there is illustrated a sheet opening/closing apparatus according to a further embodiment of the present invention which is disposed in each of a roof surface B and a side face C of a greenhouse A in an independent manner to effect both spreading of sheet and ventilation in each of the roof surface B and side face C independently.

The greenhouse A has a framework which, as is the case with FIGS. 1 or 2, comprises arch pipes 2 as vertical support rods, as well as horizontal support rods 4 and sheet retaining frames 3 extending in a direction intersecting the arch pipes 2, with a shade-like ridge member 14 being provided at the upper end of the framework.

Horizontal support rods 4 and a mounting piece 12 are provided at positions close to a bent portion intermediate between the roof surface B and the side face C. A sheet retaining frame 3 and a shade-like member 11 which is contiguous to the sheet retaining frame 3 are attached to the mounting piece 12.

A roof surface-side track 8 is laid between a horizontal support rod 4 close to the said bent portion and the ridge member 14 or a support rod 4*a* disposed below the ridge member, and a movable member 9 is attached to the roof surface-side track 8 in a vertically movable manner. The upper and lower ends of a sheet 1 are connected respectively to a sheet fixing frame 10 attached to the movable member 9 and the sheet retaining frame 3 on the mounting piece 12 so that by moving the movable member 9 vertically there are performed spreading of the sheet, as well as ventilation by opening and closing of the sheet, in a certain range L1 of the roof surface B.

Likewise, a side face-side track 8 is laid between a horizontal support rod 4 positioned near the aforesaid bent portion and a lower horizontal support rod 4, and a movable member 9 is attached to the said track 8 in a vertically movable manner, with a sheet fixing frame 10 being secured to the movable member 9. Further, the upper end of a sheet 1 is fixed to the sheet fixing frame 10 and the lower end thereof is fixed to a lower sheet retaining frame 3. By moving the movable member 9 vertically there are performed spreading of the sheet, as well as ventilation by opening and closing of the sheet, in a certain range L2 of the side face C.

Figure 4:
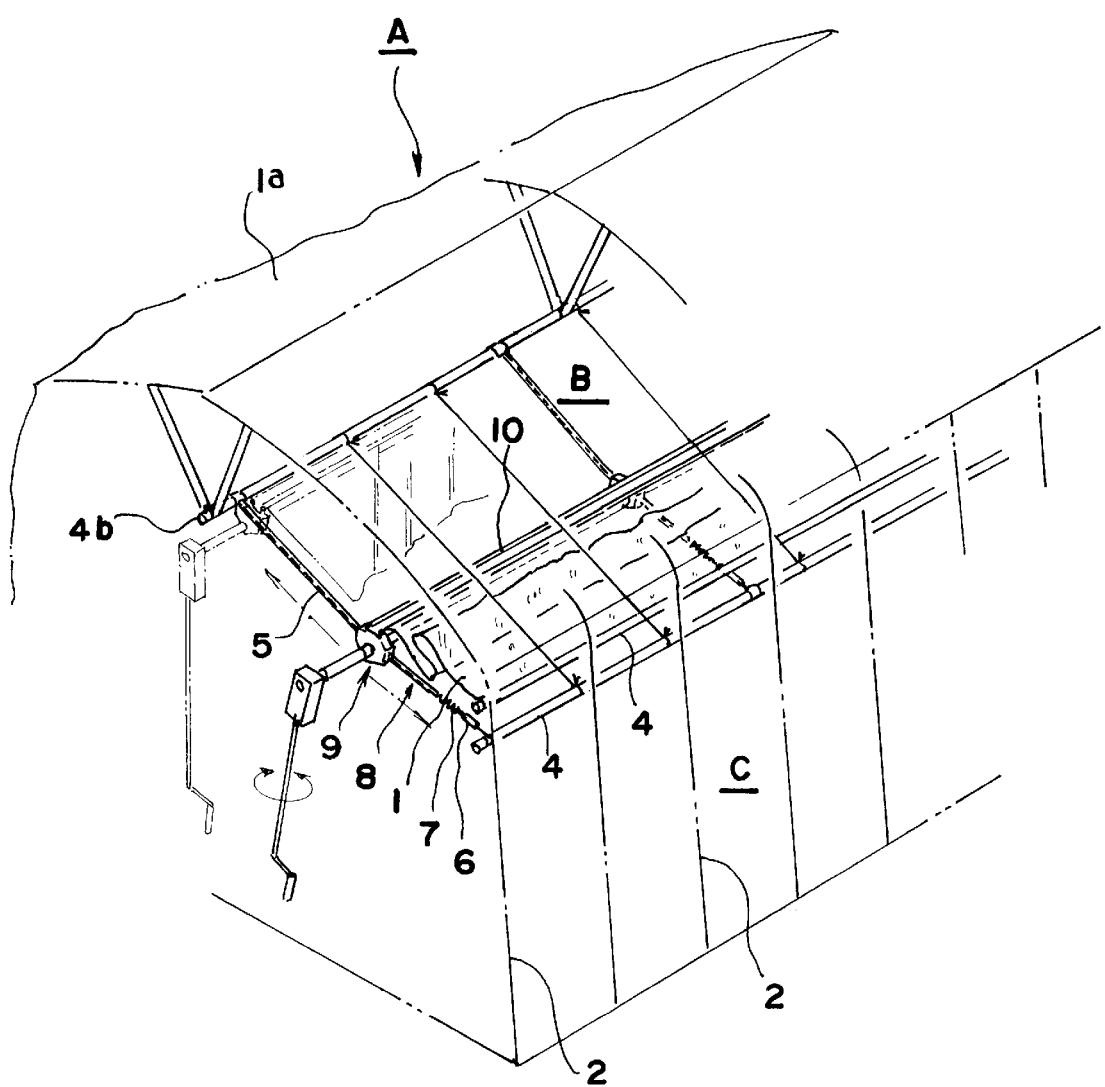
FIG. 4 is a partially cut-away perspective view of a greenhouse in which a sheet opening/closing apparatus embodying the present invention is used as a heat retaining and light shielding mechanism.

Referring now to FIG. 4, there is illustrated a sheet opening/closing apparatus according to a still further embodiment of the present invention, which is utilized for spreading and opening/closing a heat retaining or light shielding sheet.

More specifically, in a vinyl house as a greenhouse A wherein support rods 4 are installed in a direction intersecting arch pipes 2 as vertical support rods to constitute a framework, and a transparent or translucent sheet 1a is spread over the framework, the sheet opening/closing apparatus of this embodiment is utilized for spreading or opening and closing a heat retaining or light shielding sheet disposed in an upper position within the greenhouse A. Generally, according to a heat retaining mechanism in a greenhouse, a sheet is spread horizontally or somewhat inclinedly at an upper position in the greenhouse to partition the interior into two compartments, thereby improving the heating efficiency of a heater.

Likewise, according to a light shielding mechanism commonly adopted for a greenhouse, a transparent or translucent sheet is disposed horizontally or somewhat inclinedly in an opposed relation to the roof surface B, and by opening and closing the said sheet there is adjusted the quantity of sunlight radiated directly to inside plants, and the internal temperature is also adjusted.

The heat retaining or light shielding mechanism shown in FIG. 4 is used for the same purpose as above.

To be more specific, between a mounting member on the side face C side, for example, a horizontal support rod 4 and another support rod 4b suspended from the roof surface B side, a plurality of tracks 8 each comprising a chain belt 5 are laid horizontally or somewhat inclinedly and in parallel with one another, and a movable member 9 is attached to each track 8 movably. Further, a sheet fixing frame 10 is attached horizontally onto each movable member 9 and one end of a sheet 1 is fixed to another horizontal support rod 4 or a sheet retaining frame, while the opposite end thereof is fixed to the sheet fixing frame 10, and the movable members 9 are moved in one direction along the tracks 8 to move the sheet 1 in an opening or closing direction. For example, when the sheet 1 is shifted toward the side face C, the space between the support rods 4 and 4b is opened, allowing sunlight to be radiated downward directly from the roof surface B, while when the sheet 1 is pulled toward the central part, the said space is closed with the sheet 1 to cut off the downward radiation of sunlight. Thus, the quantity of sunlight to be directly radiated to plants is adjusted. Besides, with opening and closing of the sheet 1, the circulation of air in each of upper and lower compartments partitioned by the sheet 1 is adjusted, or the adjustment of internal temperature in the use of a heater is effected.

Figure 5:
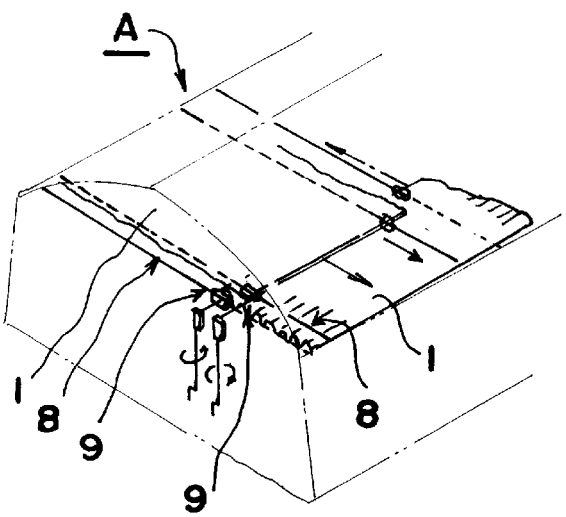
FIG. 5 is a schematic perspective view of a greenhouse in which a sheet opening/closing apparatus embodying the present invention is also used as a heat retaining and light shielding mechanism.

Referring now to FIG. 5, there is illustrated a sheet opening/closing apparatus according to a still further embodiment of the present invention, in which two heat retaining or light shielding sheets 1 are superimposed one on the other in a greenhouse A and are opened and closed in directions opposite to each other. In more particular terms, two sets of upper and lower tracks 8, 8 are laid in the transverse direction of the greenhouse A and movable members 9, 9 are attached respectively to the tracks 8 so that end portions of the upper and lower sheets 1 can be moved in an alternate manner.

Figure 6:
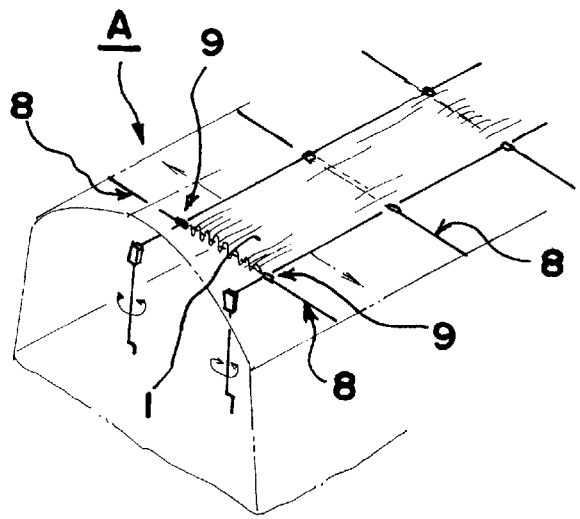
FIG. 6 is a schematic perspective view of a greenhouse in which a sheet opening/closing apparatus embodying the present invention is further used as a heat retaining and light shielding mechanism.

Referring now to FIG. 6, there is illustrated a sheet opening/closing apparatus according to a still further embodiment of the present invention, in which a plurality of tracks 8 are laid in the transverse direction of a greenhouse A and a pair of movable members 9 are attached to each track 8 so as to be opposed to each other in the extending direction of the track, thereby opening and closing a sheet 1 located between the movable member 9.

Figure 7:
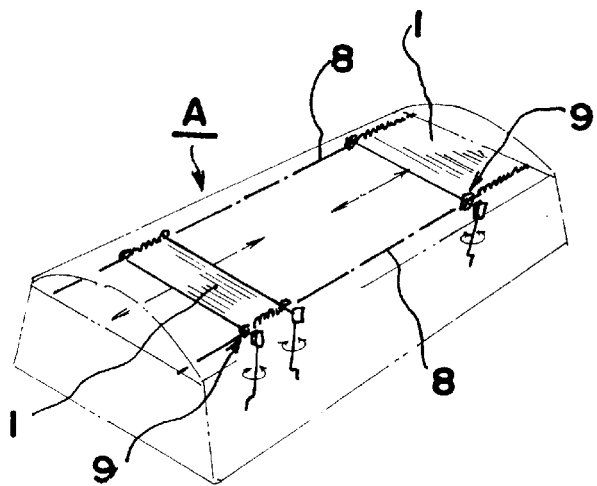
FIG. 7 is a schematic perspective view of a greenhouse in which a sheet opening/closing apparatus embodying the present invention is further used as a heat retaining and light shielding mechanism.

Referring now to FIG. 7, there is illustrated a sheet opening/closing apparatus according to a still further embodiment of the present invention, in which a plurality of tracks 8 are laid in the longitudinal direction of a greenhouse A and movable members 9 are attached to each track 8 so as to be opposed to each other. By moving the movable members 9 longitudinally along the tracks 8, a sheet 1 is opened or closed toward or from both longitudinal end portions of the tracks.

The tracks 8, movable members 9 and sheet mounting structures in FIGS. 5, 6 and 7, as well as their functions and effects, are the same as in FIG. 1.

Figure 8:
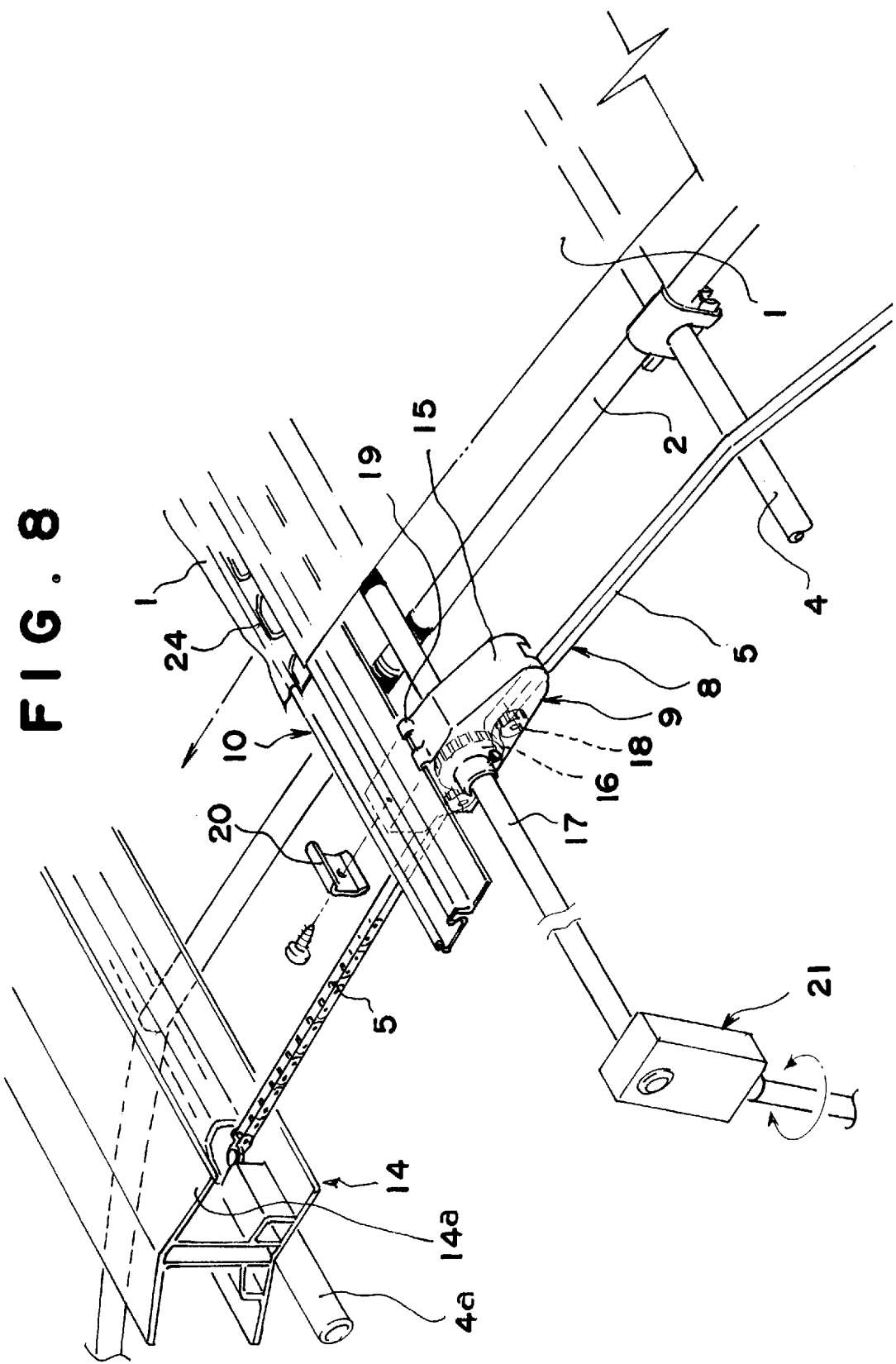
FIG. 8 is a partially enlarged perspective view of a greenhouse, showing a movable member attached to the greenhouse.
Figure 9:
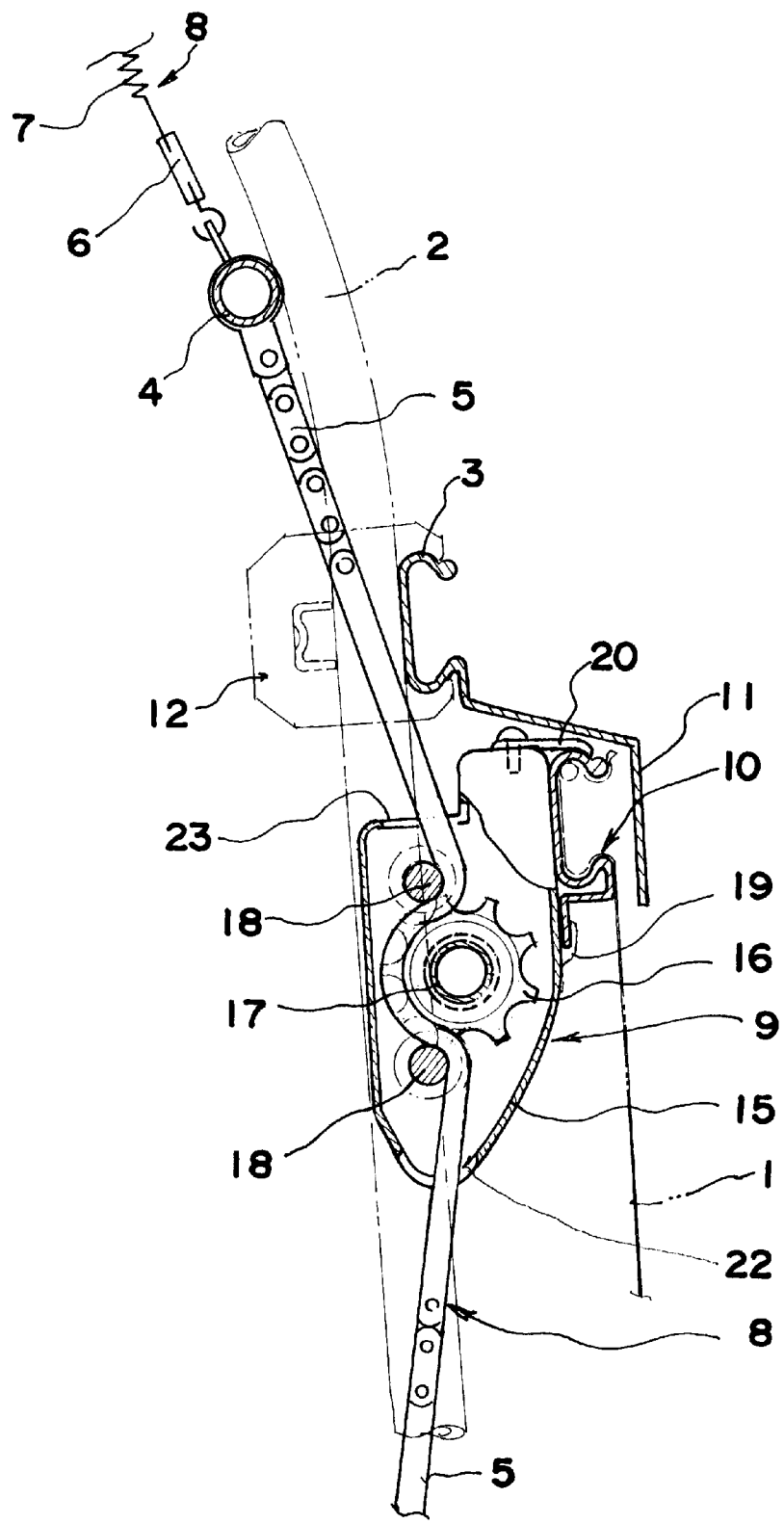
FIG. 9 is a sectional view of the movable member shown in FIG. 8 as moved into a shadelike member.
Figure 10:
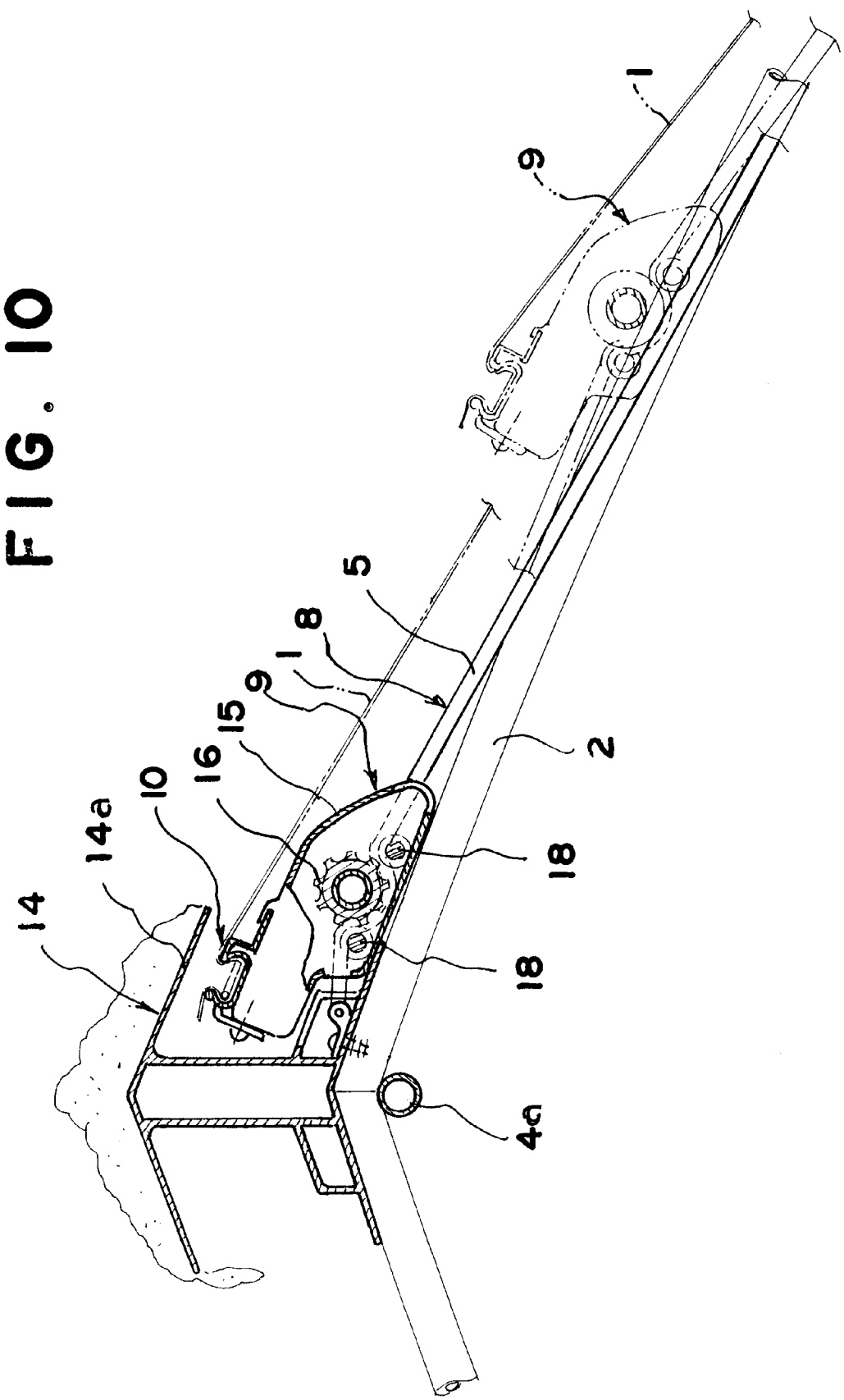
FIG. 10 is a sectional view of the movable member shown in FIG. 8 as moved into a ridge member.

FIGS. 8 to 10 show an example of a movable member 9, etc. to be used in any of the sheet opening/closing apparatus shown in FIGS. 1 to 3.

It is here assumed that two tracks 8 are laid in a vertically adjacent relation to each other, that the upper track 8 located on the roof surface 8 side is laid between the ridge member 14 and a horizontal support rod located at an intermediate position, and that the lower track 8 located on the side face C side is laid between a horizontal support rod 4 located at an intermediate position and the horizontal support rod 4 located at the lowest position, as shown in FIG. 3. The sheet opening/closing apparatus shown in FIG. 8 is disposed on the roof surface B side such as that shown in FIG. 3. The sheet opening/closing apparatus shown in FIG. 9 is disposed on the side face C side. FIG. 10 shows a state in which the movable member 9 is received inside the ridge member 14.

The tracks 8 each comprise a chain belt 5, as well as a spring 7 and a turnbuckle 6 both of which are for adjusting the tension of the chain belt 5.

A sheet retaining frame 3 as a part of the framework is constituted by a known frame having a narrow opening or a frame of a dovetail groove shape. The sheet 1 is fixed to the interior of the sheet retaining frame 3 through a known, elastic, retaining linear member.

The movable member 9 comprises a hollow housing 15, a sprocket 16 disposed rotatably within the housing 15, and a rotatable drive shaft 17 for rotating the sprocket 16. A sheet fixing frame 10, which is constituted by a frame of a dovetail groove shape, is secured to an upper part of the housing 15 through two pawl pieces 19 and 20 which are opposed to each other.

The rotatable drive shaft 17 extends through the center of the housing rotatably and transversely of the housing, with the sprocket 16 being mounted on the shaft 17. Further, a manual drive mechanism 21 such as a gear mechanism is mounted on one end of the shaft 17 so that the shaft 17 and the sprocket 16 are rotated by operation of the drive mechanism 21.

Two rollers 18, 18 or driven gears are disposed within the housing 15 rotatably and opposedly to the sprocket 16. The chain belt 5 extends through the housing 15 via openings 22 and 23 formed in lower and upper positions, respectively, of the housing. Within the housing 15, the chain belt 5 engages the sprocket 16 while being guided by the rollers 18, 18. As the sprocket 16 moves in one direction, the housing 15 moves upward or downward through the chain belt 5.

The upper end of the sheet 1 is fixed into the sheet fixing frame 10 through an elastic, retaining linear member 24. As the housing 15 moves, the upper end of the sheet 1 is pulled up or pulled down while sagging downward through the sheet fixing frame 10.

As shown in FIG. 9, an upper portion of the housing 15 disposed on the side face C side and the sheet fixing frame 10 are received in a receptacle portion formed inside a shade-like member 11 disposed at an upper position of the side face C. As shown in FIG. 10, the movable member 9 disposed on the room surface B side and the sheet fixing frame 10 are received in a receptacle portion formed inside a shade-like member 14*a* of the ridge member 14.

Figure 11:
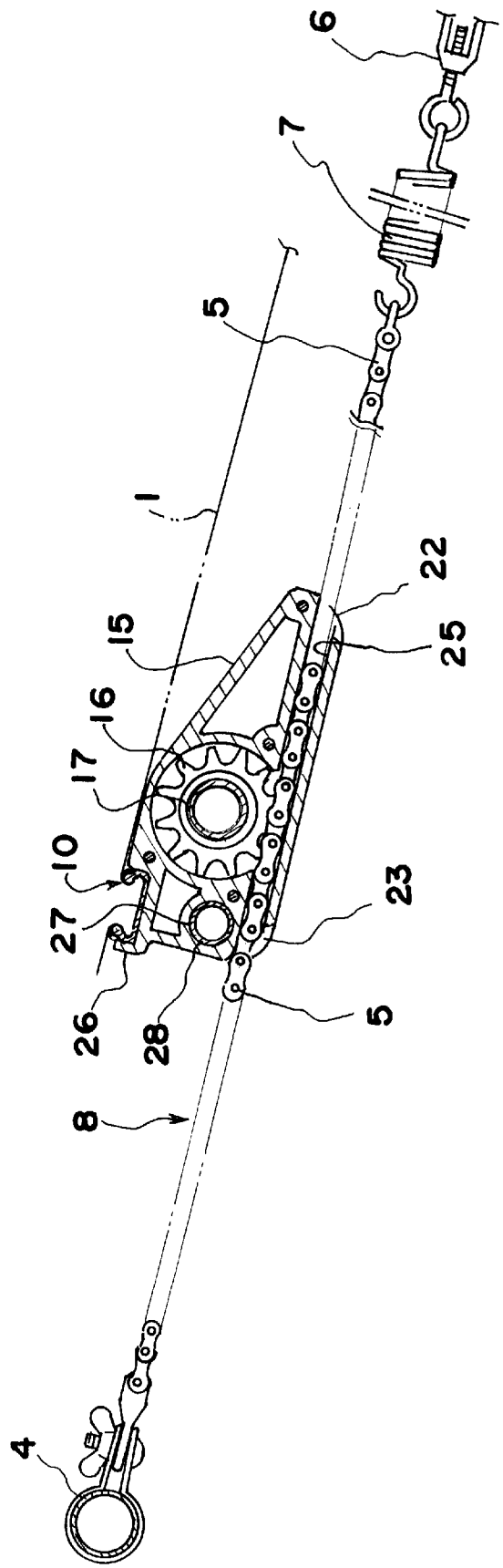
FIG. 11 is a sectional view showing another example of a movable member.

FIG. 11 shows another example of a movable member employable in the present invention.

This movable member, indicated at 9, comprises a housing 15, a gear or sprocket 16 disposed rotatably within an inner hollow portion of the housing 15, and a drive shaft 17 connected to the center of the sprocket 16 through the housing 15.

A straight guide slot 25 and openings 22 and 23 both communicating with the guide slot 25 are formed in the housing 15, and a chain belt 5 extends through the housing via the openings 22, 23 and the guide slot 25. Halfway in the guide slot 25 the chain belt 5 is in mesh with teeth of the sprocket 16. A channel member 26 is formed integrally with an upper end portion of the housing 15 and the sheet fixing frame 10 is fitted in the channel of the channel member 26. Further, a hole is formed in the upper portion of the housing 15 transversely of the housing and a pipe 28 is inserted through the said hole. Where required, the upper end of the sheet 1 may be connected to the pipe 28 instead of to the sheet fixing frame 10. Even directly to the movable member 9 the sheet 1 may be connected.

The constituent frame of the sheet fixing frame 10 is not limited to a dovetail groove frame. It may be another member insofar as the sheet 1 can be fixed thereto, such as a pipe or a pucker.

Figure 12:
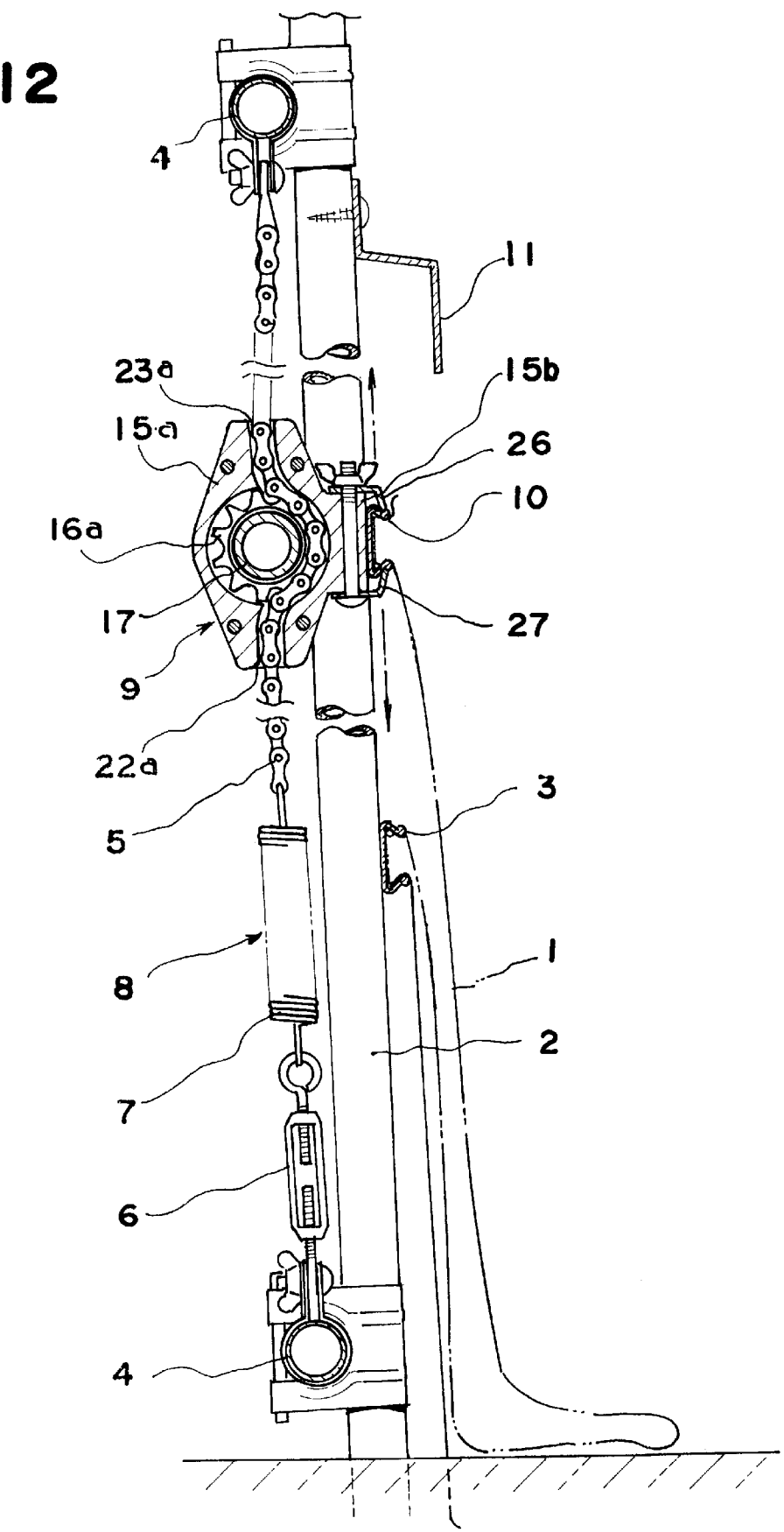
FIG. 12 is a sectional view showing a further example of a movable member.

FIG. 12 shows a further example of a movable member employable in the present invention, in which a track 8 is laid inside an arch pipe 2 as in FIG. 2.

This movable member, indicated at 9, comprises a housing 15*a*, a sprocket 16*a* disposed rotatably within an internal hollow portion of the housing 15*a*, openings 23*a* and 22*a* formed in upper and lower positions, respectively, of the housing 15*a*, and a rotatable drive shaft 17 extending through the housing 15*a* transversely of the housing and connected to the sprocket 16*a*. A chain belt 5 extends through the openings 22*a* and 23*a* and is in mesh with the sprocket 16*a* within the hollow portion of the housing. A boss 15*b* is projected from the housing 15*a* and a sheet fixing frame 10 is clamped on the boss 15*b* through clamp pieces 26 and 27. Other constructional points, as well function and effect, are the same as in the embodiment illustrated in FIG. 2.

Figure 13:
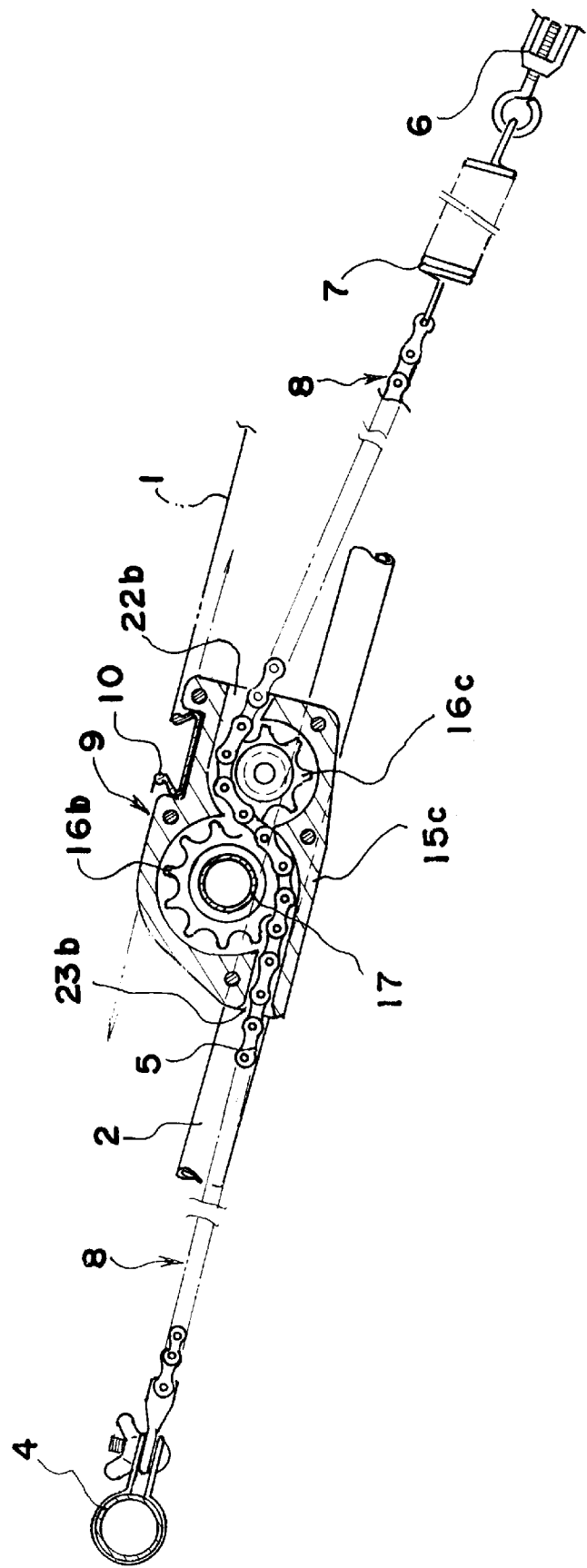
FIG. 13 is a sectional view showing a still further example of a movable member.

FIG. 13 shows a still further example of a movable member employable in the present invention.

This movable member, indicated at 9, comprises a housing 15*c*, a main sprocket 16*b* and a sub sprocket 16*c* disposed rotatably within two hollow portions formed inside the housing 15*c*, openings 23*b* and 22*b* formed in upper and lower positions, respectively, of the housing 15*c*, and a drive shaft 17 extending through the housing 15*c* transversely of the housing and connected to the main sprockets 16*b*. A chain belt 5 extends through the openings 22*b* and 23*b* and is in mesh with both main sprocket 16*b* and sub sprocket 16*c*. A channel portion is formed in the upper surface of the housing 15*c* and a sheet fixing frame 10 is fitted therein. Other constructional points, as well as function and effect are the same as in the previous example.

Figure 14:
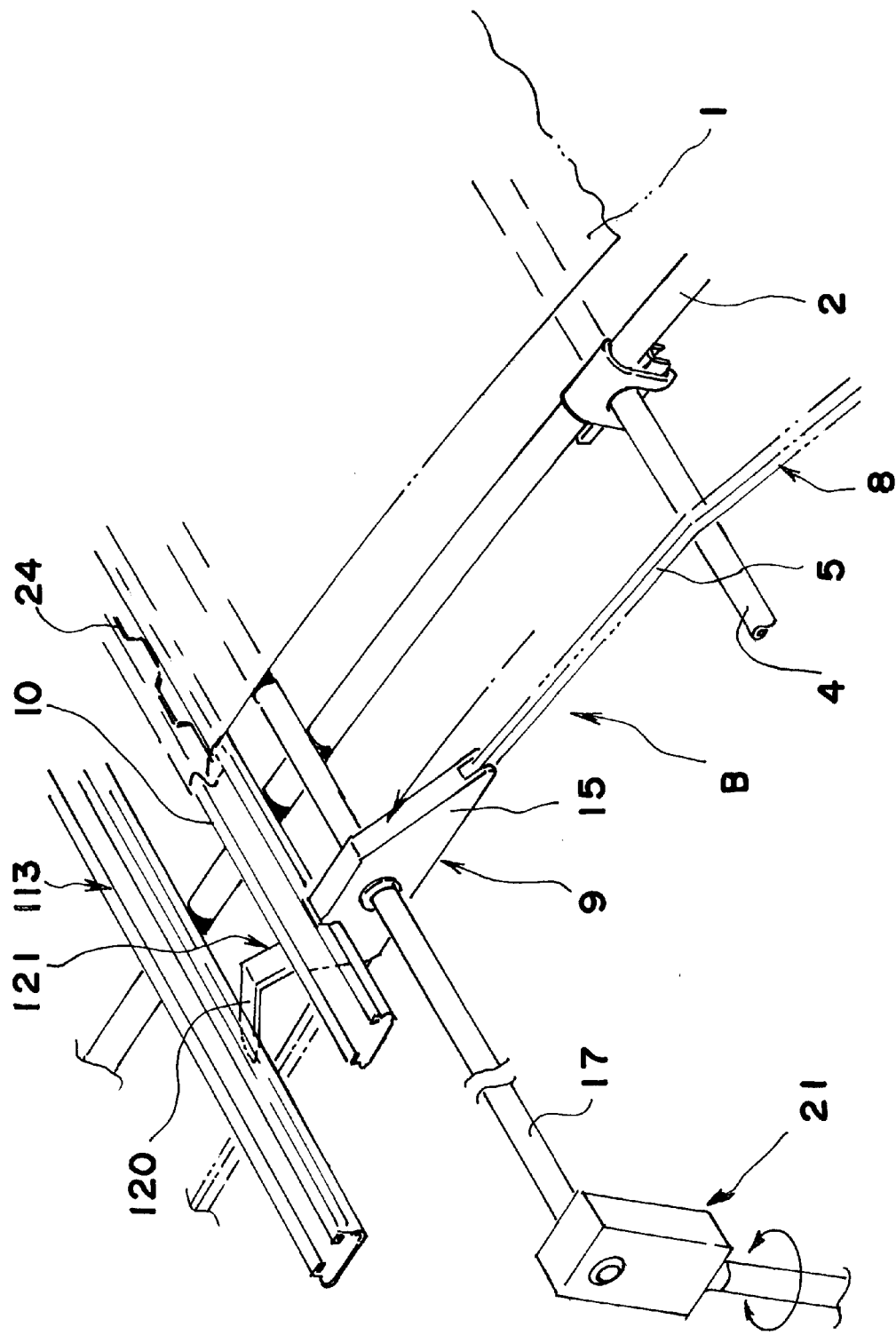
FIG. 14 is a perspective view of a sheet opening/closing apparatus further embodying the present invention.

Referring now to FIG. 14, there is illustrated a sheet opening/closing apparatus according to a still further embodiment of the present invention, in which there is used a movable member 9 provided with a lever 121.

The lever 121 is formed by a plate 120 and is fixed to an end portion of a movable member 9, that is, of a housing 15 directly or through a bracket.

The lever 121 is formed by bending the plate 120 in a chevron shape and a front end thereof extends downward with respect to the bottom level of the housing 15. In other words, when the lever 121 has reached the position of, say, the ridge member 14 shown in FIG. 8, the lever comes into abutment against the ridge member 14 and gets into the space below the ridge member 14. At this time, the housing 15 and the sheet fixing frame 10 are urged in a downward rotating direction about the shaft 17 under the lever motion of the lever 121, so that the sheet 1 is pulled in and is stretched.

In the embodiment illustrated in FIG. 14, a sheet retaining frame 113 is mounted at a position lower than the ridge member 14 and a sheet 1 is spread over the roof surface located above the sheet retaining frame 113. Further, an opening is formed below the sheet retaining frame 113 and it is opened and closed with the sheet 1. According to this arrangement, the movable member 9 stops at the position of the sheet retaining frame 113, but at this time, in the same manner as above, the lever 121 abuts the sheet retaining frame 113 and gets into the space below the sheet retaining frame 113, thereby urging the housing 15 in a downward rotating direction.

Thus, for example, when the movable member 9 moves up to the position of the ridge member 14 or of the sheet retaining frame 113, the housing 15 and the sheet fixing frame 10 are urged downward by means of the lever 121, so that the sheet fixing frame 10 swings downward to a slight extent and hence the sheet 1 is pulled in forcibly by a distance corresponding to the swing stroke and is stretched, whereby the sheet 1 is prevented from loosening or sagging and is therefore prevented from being flapped with wind.

The lever 121 is not limited to the one illustrated in FIG. 14. There may be adopted a lever of another structure insofar as a downward rotating force is exerted on both housing 15 and sheet fixing frame 10.

The present invention brings about the following effects.

(1) According to the present invention illustrated in FIGS. 1, 2, 3 and 4, spreading of sheet, ventilation by opening and closing of sheet, and heat retaining and light shielding by opening and closing of sheet, can be effected by basically the same mechanism in a greenhouse or the like. In other words, it is not necessary to design a sheet spreading mechanism, a ventilating device and a heat retaining and light shielding mechanism separately. That is, the design of a greenhouse becomes easier, it is possible to use components in common, and in building a greenhouse there can be attained improvement in point of machinability, assembling performance, working efficiency and economy.

(2) According to the present invention applied to a sheet spreading mechanism, the efficiency of the sheet spreading operation is greatly improved because the spreading of sheet can be done by movement of the movable member. Besides, since it is to only the sheet fixing frame located on the movable member side and a horizontal support rod as a constituent of the framework that both ends of sheet are fixed, the number of components used for fixing the sheet is small and hence the total number of components required for the apparatus is reduced, further, the application of sheet to the framework is easy and there is attained an improvement in point of machinability, assembling performance and economy.

Further, since sheet is spread automatically by merely moving the movable member along a track, the efficiency of the sheet spreading work is greatly improved. Besides, the spreading of sheet does not require a spreading work at an elevated place such as on the roof surface of a greenhouse and therefore the sheet spreading work can be done safely. Additionally, in the sheet spreading work, it is not necessary that plural sheets be pulled up one by one onto the roof surface, so there is no fear of a sheet being flapped or blown up or blown off by a sudden gust of wind or the like.

(3) It suffices for one end of sheet to be fixed to the sheet fixing frame disposed on the movable member side and it is no longer necessary to perform such an extra operation as pulling one sheet end to prevent the occurrence of wrinkles and of concaves and convexes in the sheet spreading work. There is no fear that the worker's hands may be injured.

(4) The sheet can be spread by being pulled forcibly with the movable member, and through this spreading work it is possible to prevent loosening and sagging of the sheet, thus eliminating the need of applying bands or the like onto the sheet after spreading. Consequently, the number of components required becomes smaller and banding is not necessary.

(5) With the sheet spread on the framework, if a strong wind or a sudden gust of wind should act on the greenhouse due to a typhoon or the like, all that is required is merely moving the sheet downward from the whole of the framework in the greenhouse through the movable member to open the greenhouse, whereby the strong wind or sudden gust of wind will pass through the greenhouse to the exterior and thus the greenhouse is prevented from being blown off or damaged.

(6) According to the present invention applied to a ventilating mechanism, sheet is moved from above to below of the greenhouse to open an opening between support rods, and while the said opening is closed, the movable member and the sheet fixing frame assume their upper positions, so there is no fear that the movable member and the frame may be buried in snow accumulated on the ground or become frozen. Therefore, even without performing a snow clearing work, the sheet moving operation for ventilation can be done immediately.

(7) Since ventilation can be done by merely pulling up or down an end portion of sheet, even if dust, water, snow, volcanic ash or sand is adhered to the sheet surface, the sheet moving operation for ventilation can be done without being influenced at all by such deposits and hence there is no fear of the sheet being rubbed against such deposits and being ruptured thereby.

(8) Even if the opened condition of the greenhouse, with the sheet pulled down, continues for a long period of time, since the sheet hangs down, rain water or snow even if adhered to the outer surface of the sheet will flow down and cause no obstacle when the sheet is again pulled up in the closing direction, whereby the stain of the sheet surface or the occurrence of mold is prevented.

(9) The sheet is opened from above to below and the lower portion thereof is fixed to a lower horizontal support rod whereby the lower portion of the greenhouse close to the ground is closed at all times. Therefore, wind or cold air is prevented from suddenly entering the greenhouse from below, whereby even if the plants in the greenhouse are seedlings, cold air does not act on the plants and no bad influence is exerted on the growth of the plants. Consequently, it is not necessary to use a dead sheet to prevent the entry of cold air, etc. That is, the greenhouse assembling work is simplified and an improvement can be attained in point of assembling performance, machinability and economy.

(10) The sheet is opened and closed through the movable member which is movable along the track and which is merely influenced by the direction of the track and not greatly influenced by the angle of the framework. Therefore, the sheet opening and closing operation can be done even when the framework is somewhat bent or deflected, and there is no fear of the sheet becoming deflected or immovable.

(11) Even in the present invention applied to a heat retaining and light shielding mechanism, there can be attained the same effects as the above (7) and (10).

What is claimed is:

1. A sheet opening/closing and spreading apparatus comprising a pair of support rods opposed to each other, a track having opposite ends fixed to, and laid between, said paired support rods, and a movable member attached along, and movably to, said track; a sheet is spread and opened between said paired support rods with movement of said movable member along said track.

2. A sheet opening/closing and spreading apparatus according to claim 1, wherein said movable member comprises a housing, a gear or sprocket disposed rotatably within said housing, and a drive shaft extending through said housing transversely of the housing and connected to said gear or sprocket, and said track is constituted by a chain belt, said chain belt extending through said housing longitudinally of the housing and being in mesh with said gear or sprocket.

3. A sheet/opening and spreading apparatus according to claim 2, wherein a sheet fixing frame constituted by a dovetail frame, a pipe, or a pucker, is attached to said movable member.

4. A sheet/opening and spreading apparatus according to claim 1, wherein a sheet fixing frame constituted by a dovetail frame, a pipe, or a pucker, is attached to said movable member.

5. A sheet opening/closing and spreading apparatus comprising a pair of support rods opposed to each other, a track having opposite ends fixed to, and laid between, said paired support rods, a movable member attached along, and movably to, said track; a sheet fixing frame attached to said movable member and extending in a direction traversing the movable member, and a sheet fixed at one end thereof to one of said support rods, the opposite end of said sheet being fixed to said sheet fixing frame, and said sheet being spread or opened between said paired support rods by moving said movable member along said track.

6. A sheet opening/closing and spreading apparatus according to claim 5, wherein said track or tracks are each constituted by a chain belt, and said movable member or members each comprise a housing, a sprocket disposed rotatably within said housing and engaged with said chain belt, and a rotatable drive shaft for rotating said sprocket.

7. A sheet opening/closing and spreading apparatus used in a greenhouse wherein a framework is constituted by both vertical and horizontal support rods and a sheet is spread over said framework, said sheet opening/closing and spreading apparatus comprising one or plural tracks having opposite ends fixed to, and laid between, two of said horizontal support rods, a movable member or members attached along, and movably to, said track or tracks; a sheet fixing frame extending horizontally and attached to said movable member or members, one end of the sheet being fixed to a horizontal support rod and the opposite end thereof fixed to said sheet fixing frame, the sheet being spread over said framework by moving said movable member or members along said track or tracks.

8. A sheet opening/closing and spreading apparatus according to claim 7, wherein said track or tracks are each constituted by a chain belt, and said movable member or members each comprise a housing, a sprocket disposed rotatably within said housing and engaged with said chain belt, and a rotatable drive shaft for rotating said sprocket.

9. A sheet opening/closing and spreading apparatus used in a greenhouse wherein a framework is constituted by both vertical and horizontal support rods, a sheet is spread over said framework and ventilation is performed by opening and closing a portion of the sheet, said sheet opening/closing and spreading apparatus comprising one or plural tracks having opposite ends fixed to, and disposed between, an upper horizontal support rod and a lower horizontal support rod, a movable member or members attached along, and movably to, said track or tracks; a sheet fixing frame extending horizontally and attached to said movable member or members, the lower end of the sheet being fixed a lower horizontal support rod and the upper end thereof fixed to said sheet fixing frame, and wherein ventilation is performed by spreading or opening the sheet between the upper and lower horizontal support rods which spreading or opening motion of the sheet is effected by moving said movable member or members along said track or tracks.

10. A sheet opening/closing and spreading apparatus according to claim 9, wherein said track or tracks are each constituted by a chain belt, and said movable member or members each comprise a housing, a sprocket disposed rotatably within said housing and engaged with said chain belt, and a rotatable drive shaft for rotating said sprocket.

11. A sheet opening/closing and spreading apparatus used in a greenhouse wherein a framework is constituted by both vertical and horizontal support rods, a sheet is spread over said framework, and a heat retaining or light shielding sheet is disposed below said spread sheet so as to be capable of being opened and closed, said sheet opening/closing and spreading apparatus comprising two support rods disposed at upper positions within said framework in an opposed relation to each other, one or plural tracks having opposite ends fixed to, and laid between said two support rods, a movable member or members attached along, and movably to, said track or tracks; a sheet fixing frame fixed to said movable member or members and extending horizontally, one end of said heat retaining or light shielding sheet being fixed to one of said two support rods and the opposite end thereof fixed to said sheet fixing frame, and said heat retaining or light shielding sheet being spread or opened between said two support rods by moving said movable member or members along said track or tracks.

12. A sheet opening/closing and spreading apparatus comprising a pair of support rods opposed to each other, a track laid between said paired support rods, and a movable member attached to said track movably, and wherein a sheet is spread and opened between said paired support rods with movement of said movable member along the said track;

said movable member comprising a housing, a gear or sprocket disposed rotatably within said housing, and a drive shaft extending through said housing transversely of the housing and connected to said gear or sprocket, and said track is constituted by a chain belt, said chain belt extending through said housing longitudinally of the housing and being in mesh with said gear or sprocket.

13. A sheet opening/closing and spreading apparatus comprising a pair of support rods opposed to each other, a track laid between said paired support rods, a movable member attached to said track movably, a sheet fixing frame attached to said movable member and extending in a direction traversing the movable member, and a sheet fixed at one end thereof to one of said support rods, the opposite end of said sheet being fixed to said sheet fixing frame, and said sheet being spread or opened between said paired support rods by moving said movable member along said track;

said track or tracks are each constituted by a chain belt, and said movable member or members each comprise a housing, a sprocket disposed rotatably within said housing and engaged with said chain belt, and a rotatable drive shaft for rotating said sprocket.

14. A sheet/opening and spreading apparatus comprising:
first and second support rods spaced from each other;
a track fixed to said support rods and extending between said support rods;
a movable member connected to said track and movable along said track with respect to said track;
a sheet connected to said movable member, said sheet being movable with said movable member to be moved between said first and second support rods by movement of said movable member along said track.

15. A sheet/opening and spreading apparatus according to claim 14, further comprising:
a drive mechanism on said movable member for exerting traction on said track to move said movable member along said track.

16. A sheet/opening and spreading apparatus according to claim 14, further comprising:
a sheet retaining frame connected to a side of said sheet diametrically opposite said movable member, movement of said movable member along said track spreading said sheet between said first and second support rods.

17. A sheet/opening and spreading apparatus according to claim 16, wherein:
said sheet retaining frame is positioned between said first and second support rods.

18. A sheet/opening and spreading apparatus according to claim 17, further comprising:
a drive mechanism on said movable member for exerting traction on said track to move said movable member along said track.

* * * * *